United States Patent [19]
Culbertson

[11] 3,960,865
[45] June 1, 1976

[54] MONO OR BIS 3-(POLYPROPYL OR BUTYL-PROPENYL)-AMINO ALKYL PIPERAZINES

[75] Inventor: George S. Culbertson, Downers Grove, Ill.

[73] Assignee: Standard Oil Company, Chicago, Ill.

[22] Filed: Apr. 17, 1975

[21] Appl. No.: 568,848

Related U.S. Application Data

[60] Division of Ser. No. 391,590, Aug. 27, 1973, which is a continuation-in-part of Ser. No. 116,722, Feb. 11, 1971, abandoned.

[52] U.S. Cl. ............... 260/268 PL; 260/583 P; 260/584 R
[51] Int. Cl.² ................................ C07D 295/12
[58] Field of Search ..................... 260/268 PL

[56] References Cited
OTHER PUBLICATIONS
Chevro Research Co. Chemical Abstracts vol. 68, 42042Z (1968).

*Primary Examiner*—Alton D. Rollins
*Assistant Examiner*—Jose Tovar
*Attorney, Agent, or Firm*—Fred R. Ahlers; Arthur G. Gilkes; William T. McClain

[57] ABSTRACT

Title compounds are novel oil-soluble, detergent-dispersant addition products for crankcase lubricating oils and are prepared by reacting a primary or secondary amine with 1-chloro-2-methylpropenyl substituted alkane hydrocarbons, especially 1-chloro-2-methylpropenyl terminated butene polymers, having a total of 20 to 180 carbon atoms.

3 Claims, No Drawings

MONO OR BIS 3-(POLYPROPYL OR BUTYL-PROPENYL)-AMINO ALKYL PIPERAZINES

RELATED APPLICATIONS

This is a division of application Ser. No. 391,590 filed Aug. 27, 1973, which is a continuation in part of application Ser. No. 116,722 filed Feb. 11, 1971, now abandoned.

BACKGROUND OF THE INVENTION

N-hydrocarbyl amines can be prepared by known methods through the reaction of a hydrocarbon monochloride and a nitrogen-containing compound having at least one hydrogen atom on a nitrogen atom. The problem encountered in that preparative route is the obtension of a reactive hydrocarbon monochloride when the desired N-hydrocarbyl substituent is to be derived from a mono-alkene hydrocarbon having a terminal double bond. Direct chlorination of such an alkene hydrocarbon with liquid or gaseous chlorine results in random chain chlorination, chlorination of side chains and the formation of products containing the relatively unreactive neopentyl chloride. Such a product is relatively unreactive with HN< containing compounds. Chlorination of ethylenic compounds with peroxidecatalyzed sulfuryl chloride ($SO_2Cl_2$) is described by M. S. Kharasch and H. C. Brown in J.A.C.S. 61, 3432–34. For example there is described such chlorination of cyclohexene to dichlorocyclohexane, allyl chloride to 1,2,3-trichloro propane, sym. dichloroethylene to sym. tetrachloroethane, stilbene to d,d' and $\beta,\beta'$-stilbene dichlorides and tetrapenylethylene to its dichloride. In each instance that chlorination of ethylenic compound added chlorines to both sides of the double bond and produce a saturated compound. The authors in that and prior articles point out that such sulfuryl chloride reaction of ethylenic compounds not peroxide-catalyzed is either so slow as to be not feasible for even laboratory use or does not proceed at all.

Chlorination with liquid or gaseous chlorine of alkenes having a terminal double bond or an internal double bond can be readily conducted to high chlorine contents. For example, a polybutene of average molecular weight of about 2000 can be so chlorinated to a 35% chlorine content. But the resulting chlorinated alkene is relatively unreactive with such HN< group nitrogen-containing compounds or even alkali metal hydroxides because most of the chlorine atom substituents are rather stably bound.

N-hydrocarbyl derivatives of aliphatic polyamines having hydrocarbyl-substituents of from about 700 to about 100,000 in molecular weight (50–7145 carbon atoms) are described in U.S. Pat. No. 3,275,554 as non-ash forming detergent addition agents for mineral lubricant oils.

SUMMARY OF INVENTION

It has now been found that N-hydrocarbyl substituted amines having lower molecular weight hydrocarbyl substituents, e.g. from about 350 up to about 2500 in molecular weight (about 25 to about 180 carbon atoms) are useful detergent addition agents for lighter hydrocarbon fractions such as gasoline, kerosene, diesel fuel and heating oils. Of these, the N-hydrocarbyl-substituted amines whose hydrocarbyl-substituents are slightly branched, such as those derived from Friedel-Crafts catalyzed ($AlCl_3$) polymerization of propene or butenes, respectively, to liquid viscous polypropylenes or polybutylenes are more advantageously useful for that detergent purpose. Also found are that N-hydrocarbyl substituted bis(amino-alkyl) piperazine, alkylene polyamines and di(hydroxyalkyl) polyalkylene polyamines whose hydrocarbyl-substituents have an average molecular weight of 700–2500 are excellent motor crankcase oil detergents.

SPECIFIC EMBODIMENTS

The necessary reactant for preparation of such useful N-hydrocarbyl substituted amines are the 1-chloropropenyl terminated alkanes, especially propene and butene polymers, which have, in general, a single terminal unsaturated group as in the formula

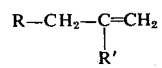

wherein R' is hydrogen or methyl and R comprises repeating propyl or butyl groups in such numbers to provide with the indicated terminal unsaturated 3-propenyl or 2-methylpropenyl group a total of about 25 to 180 number average carbon atoms. The preparation of such 1-chloropropenyl terminated alkane hydrocarbons is taught in the above-mentioned copending application whose disclosure is incorporated herein by reference.

In general, the 1-chloropropenyl or 1-chloro-2-methylpropenyl substituted alkane hydrocarbon can be prepared by first reacting at a temperature of 175°F, in the absence of peroxide catalyst but in the presence of benzene as solvent, 1.0–1.5 moles of sulfuryl chloride ($SO_2Cl_2$) per mole of the propenyl terminated alkane to produce, as indicated in equation I below, the indicated 1,2-dichloropropyl terminated alkane and by-product $SO_2$ and then dehydrochlorinating such 1,2-dichloropropyl terminated alkane, as indicated in equation II below, to the indicated 1-chloropropenyl terminated alkane and by-product HCl.

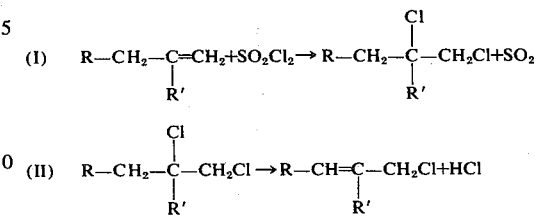

In both equations R and R' are the same as before defined.

Dehydrochlorination of the indicated 1,2-dichloropropyl or 1,2-dichloro-2-methylpropyl terminated alkane can be accomplished with anhydrous sodium or potassium carbonate or hydroxide; alkaline earth metal oxide, hydroxide or carbonates; or other chemical compound useful for dehydrochlorination which leaves no non-volatile acidic residue, and preferably leaves a chloride-containing residue which is insoluble in benzene or the 1-chloropropenyl terminated alkene. Dehydrochlorination of the indicated 1,2-dichloropropenyl or 1,2-dichloro-2-methylpropyl terminated alkane also can be accomplished thermally at a temperature of 300°–400°F. While such termally splitting out of HCl leaves some of it in the resulting reaction mass, such remaining HCl conveniently is removed by distilling off benzene. Advantageously, reactions I and II can be conducted sequentially without prior removal of by-product $SO_2$. Reaction I is conducted with reflux of benzene solvent and part of by-product $SO_2$ is driven off while heating the first reaction mass to the termperature of 300°–400°F, part of by-product HCl is driven off as it is formed at such temperature and any residual amounts of $SO_2$ and the last amount of HCl to be split out can be removed while distilling off benzene. The removal of $SO_2$ and splitting out of HCl as well as its removal conveniently can be accomplished by injecting an inert gas (e.g. nitrogen or carbon dioxide) into the reaction mass while heating the first reaction mass to a temperature of 300°–400°F. and continuing inert gas injection until benzene solvent has been removed and HCl is no longer present in the exhaust gas.

Any of the before illustrated propenyl terminated alkanes having a total of 20–180 carbon atoms (M.W. of 280–2520) are useful as starting hydrocarbon reactant for preparation of the foregoing 1-chloropropenyl or 1-chloro-2-methylpropenyl terminated alkane. For example, such propenyl terminated alkane can be a product of cracking petroleum or a fraction thereof or a double bond isomerized fraction or compound so first produced. An excellent source of such propenyl or 2-methylpropenyl terminated alkane, as before indicated, are the commercially available 280–2520 number average molecular weight liquid viscous polypropenes or polybutenes derived from the Friedel-Crafts catalyzed polymerization of propene or butenes. Such polybutenes are commercially produced by said polymerization of isobutylene, mixtures containing isobutylene and butene-1and/or butene-2 and even such mixtures, a petroleum refining fraction of $C_4$ hydrocarbons known as B-B stream, which in addition to such butenes also contain butane and a small amount, 1–5%, butadiene.

The present inventive N-hydrocarbyl amines are, as before indicated, derived by reacting a bis(aminoalkyl) piperazine, alkylene polyamine or N-di(hydroxyalkyl) polyalkylene polyamine with the aforementioned 1-chloropropenyl or 1-chloro-2-methylpropenyl-substituted alkane hydrocarbons. Such reaction is conventional for the introduction of an N-hydrocarbon-substituent on an amino-nitrogen and is accompanied by the splitting out of HCl. For example in the reaction of ethyl chloride with ethylene diamine $$C_2H_5Cl + H_2N-C_2H_4NH_2 \rightarrow C_2H_5-NH-C_2H_4NH_2 + HCl.$$

As in that reaction 1 or 4 moles of ethyl chloride can react with ethyl ethylene diamine to form N-ethyl and N-diethyl, N,N'-diethyl, N,N,N'-triethyl and N,N'-tetraethyl ethylenediamine, one or more moles of 1-chloropropenyl- and 1-chloro-2-methylpropenyl-substituted alkanes can react with bis-(aminoalkyl) piperazine, alkylene polyamine, or N,N-di(hydroxyalkyl) alkylene polyamine to form N-mono-, di-, tri-, etc. substituted products. However, in general only one hydrogen of a primary aminonitrogen is replaced by the rather large 1-propenyl- or 1-(2-chloropropenyl)-substituted alkane.

The following illustrate the classes of the bis-(aminoalkyl) piperazine, alkylene polyamine and N,N-di(hydroxyalkyl) alkylene polyamine to be N-substituted by the 1-propenyl- or 1-(2-methylpropenyl)-substituted alkane (hereinafter "Z") according to this invention.

Bis-(aminoalkyl) piperazine

These amines are derivatives of di-nitrogen-containing heterocyclic diamine, piperazine, which is the cyclic diamine obtained from two moles each of ammonia and ethylene chloride:

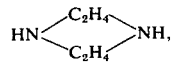

and are, therefore, $N_1,N_4$-bis(aminoalkyl) piperazines having the general formula:

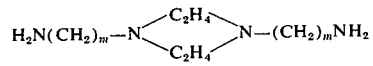

wherein $m$ is an integer from 1 to 10 as in bis(aminomethyl)-, bis(aminoethyl)-, bis(aminopropyl)-, bis-(aminobutyl)-, bis(aminopentyl)-, bis(aminohexyl)-, bis(aminoheptyl)-, bis(aminooctyl)-, bis(aminononyl)-, and bis(aminodecyl)-piperazine.

Alkylene Polyamine

These amines can be represented by the formula $H_2N-(-A-NH)_nH$ wherein n is an integer from 1 to 10 and $-A-$ is a divalent hydrocarbon radical containing 1 to 10 methylene radicals. For example the alkylene polyamines can be diaminoalkanes including methylene diamine, 1,2-dimethylene diamine, 1,3-trimethylene diamine, 1,4-tetramethylene diamine, 1,5-pentamethylene diamine, 1,6-hexamethylene diamine, 1,7-heptamethylene diamine, 1,8-octamethylene diamine, 1,9-nonamethylene diamine and decamethylene diamine. Said alkylene polyamines also include the amines wherein $-A-$ is ethylene, propylene, butylene, pentylene, hexylene, heptylene, octylene, nonylene, and decylene radicals as are obtained by the known reaction of 1 to 10 moles of the appropriate dichloroalkane (e.g. ethylene, propylene, etc.)dichloride with 2 to 11 moles of ammonia. Of these members of alkylene polyamines the ethylene or propylene polyamines having 2 to 10 ethylene or propylene radicals and 3 to 11 amino (2 primary amino and 1–9 secondary amino) radicals are available as commercial products. The most preferred of these are diethylenetriamine, triethylenetetramine, tetraethylenepentamine, pentaethylenehexamine, hexaethyleneheptamine, dipropylenetriamine, tripropylenetetramine, tetrapropylenepentamine, pentapropylenehexamine, and hexapropyleneheptamine.

Di(hydroxyalkyl) Alkylene Polyamine

These amines have two hydrogens of the same primary amino radical of the alkylene polyamines replaced by a hydroxyalkyl group, for example, by the known reaction of two moles of an alkylene oxide (e.g. ethylene or propylene oxide) or alkylene diol (ethylene or propylene glycol) or alkylene chlorohydrin (e.g. ethylene or propylene chlorohydrin) with the alkylene polyamine. Such di(hydroxyalkyl) alkylene polyamines have the formula $(HO-X-)_2N-(-A-NH)_nH$ wherein X is ethylene or propylene and $-A-$ and $n$ have the above meanings. Specific illustrative members of the di(hydroxyalkyl) alkylene polyamines are N-di(-hydroxyethyl)ethylene diamine, N-di(hydroxyethyl) diethylene triamine, N-di(hydroxyethyl) triethylene tetramine N-di(hydroxyethyl) tetraethylenepentamine, N-di(hydroxyethyl) pentaethylene hexamine, N-di(hydroxypropyl) propylenediamine, N-di(hydroxypropyl) dipropylenetriamine, N-di(hydroxypropyl) tripropylenetriamine, N-di(hydroxyethyl) tetrapropylenepentamine, and N-di(hydroxypropyl) pentapropylene hexamine, that is wherein X is —$C_2H_4$— or —$C_3H_6$—.

1-Chloropropenyl or 1-Chloro-2-Methylpropenyl Alkane

These reactants are obtained by the sulfuryl chloride 1,2-dichlorination of preferably propene or butylene polymer followed preferably by the thermal dehydrochlorination of the 1,2-dichloride product of the first step. Said propene or butene polymer, respectively, have the single terminal propenyl or 2-methylpropenyl group with the remainder of the polymer entities being substantially alkane in nature because of the repeating propyl or butyl groups to provide a total of 25 to 180 number average carbon atoms in the polymer entities. Such polymers have hereinbefore been identified by the formula

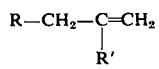

wherein R' is hydrogen in the propene polymer and methyl in the butylene polymer and wherein R contains 21 to 177 carbon atoms (7 to 59 propyl groups) in the propene polymer or 20 to 176 carbon atoms (5 to 44 butylene) groups in the butylene polymer.

The following two examples illustrate preparation of 1-chloro-2-methylpropenyl alkane in which R contains repeating butyl units. Since the butylene polymers used have 2000 and 330 number average molecular weight ($M_n$) the number average carbon atoms are, respectively, 142 and 23 and the butyl groups in R are, respectively, 138 and 19. Examples 1 and 2 illustrate 1,2-dichlorination of the two butylene polymers with sulfuryl chloride followed by the preferred thermal dehydrochlorination (thermal cracking) of the 1,2-dichlorides to obtain the 1-chloro-2-methylpropenyl terminated polybutyl groups-containing alkane products.

EXAMPLE 1

A mixture of 1500 grams (0.75 mole) of a polybutene having a number average molecular weight ($\overline{M}_n$) of about 2000 and 1000 cc benzene are stirred at 150°F. while 150 grams (1.12 mole) $SO_2Cl_2$ is added over about one hour in a 5 liter 3 necked flask equipped with an efficient stirrer, condenser, thermometer, drying tube and dropping funnel and then the stirred reaction mixture is heated to 175°F. and held there for about 2 hours. The resulting reaction mixture is stirred and heated to 340°F. with nitrogen injection into the liquid to remove HCl and $SO_2$ and benzene solvent. Residual $SO_2$ and HCl are removed by holding the stirred reaction mixture at 340°F. for 60 minutes. The residual liquid is viscous liquid deep amber in color and has a $\overline{M}_n$ of 2015, 2.10% chlorine and 0.02% sulfur. The chlorine content is over the theoretical 1.75% chlorine for the desired 1-chloro-2-methylpropenyl terminated product is indicative of a product having 75% 1-chloro-2-methyl propenyl terminated product and 25% original 1,2-dichloride of the butylene polymer.

EXAMPLE 2

In the apparatus described in Example 1 there are combined five moles of a polybutene having a $\overline{M}_n$ of about 330 and 1000 cc benzene. The mixture is heated to 150°F. with stirring and 750 grams $SO_2Cl_2$ (5.6 moles) is added over a 1 hour period. This mixture is stirred and heated to 175°F. and held at 175°F. for 2.5 hours. Thereafter the temperature of resulting stirred mixture is increased to 350°F., nitrogen gas is injected into the liquid while it is being heated and the 350°F. temperature is maintained for about 1 hour to remove gaseous by-products and benzene solvent. The $SO_2$ and HCl free viscous liquid is filtered. The filtered product thus prepared will be found to contain about 10% chlorine which is only 4.0% excess over the theoretical amount of chlorine in the corresponding 1-chloro-2-methylpropenyl terminated butylene polymer. The dehydrochlorination step of Examples 1 and 2 can be conducted to remove all excess chlorine by increasing the thermal cracking temperature and/or increasing the time of the inert gas injection.

EXAMPLE 3

N-polybutenyl tetraethylene pentamine is prepared by heating the product of Example 1 (1500 grams) and 1500 cc of xylene to 285°F. and then adding 135 grams (0.71 mole) tetraethylene pentamine dropwise over a period of about 2 hours. Thereafter the reaction mixture is stirred and maintained at 285°F. for 16–18 hours. The reaction mixture is cooled, to 240°F., and excess aqueous sodium hydroxide is added, with stirring, to neutralize retained HCl. Stirring is stopped, the aqueous phase is permitted to settle. The aqueous phase contains the HCl in neutralized form (NaCl) and excess NaOH. The clear upper xylene solution is removed by decantation, xylene is distilled therefrom assisted with nitrogen gas injection into the liquid while distilling xylene and the distillation residue is dissolved in 1050 grams SAE 5W oil. The solution is filtered with a diatomaceous filter aid. In this manner a 2300 gram yield of oil solution of N-substituted tetraethylene pentamine having a nitrogen content of 1.0%, chlorine content of 0.45%, sulfur content of 0.11% and a viscosity at 210°F. of 840 SSU. The amine yield is about 70% based on tetraethylene pentamine charged. Said N-substituted tetraethylenepentamine is believed to have the formula H—(NH—$C_2H_4$)$_4$—NH—Z wherein Z has the formula

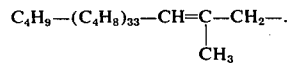

EXAMPLE 4

The 1-chloro-2-methylpropenyl terminated butylene polymer prepared as described in Example 1 is dissolved in toluene and reacted with bis-(aminopropyl) piperazine in a molar ratio of 2.0 mole of said monochloride to 1.0 mole of bis(aminopropyl) piperazine at a temperature of 230°F. for 16–18 hours. The stirred reaction mixture is cooled to 220°F., residual HCl is taken up when neutralized with aqueous caustic, the aqueous phase permitted to settle and the organic phase recovered by decantation. The recovered organic phase is heated to drive off toluene. The residue is dissolved in SAE 5W mineral oil to provide a 50% concentration of the N,N-disubstituted bis(aminopropyl) piperazine believed to have the formula

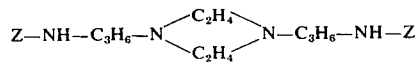

wherein each Z is

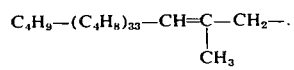

EXAMPLE 5

The 1-chloro-2-methylpropenyl terminated butylene polymer product prepared as described in Example 1 is dissolved in xylene and is reacted with N-di(hydroxyethyl) diethylene triamine as described in Example 3 but in a 1.0:1.0 molar ratio of reactants at 250°F. for about 16 hours. Thereafter the mixture is neutralized with aqueous caustic. The xylene phase is recovered, xylene is distilled therefrom and the residue dissolved in SAE 5W oil to a product having 55% of the N'-substituted N-di(hydroxyethyl) diethylene triamine product believed to have the formula Z—NH—C$_2$H$_4$—N-H—C$_2$H$_4$—N—(C$_2$H$_4$OH)$_2$ wherein Z is the substituent shown in Examples 3 and 4.

EXAMPLE 6

The 1-chloro-2-methylpropenyl terminated butylene polymer product of Example 2 (2.0 moles) is dissolved in 1250 grams xylene and is reacted with ethylene diamine (2.2 moles) for 16 hours at 250°F. Thereafter the mixture is neutralized with aqueous sodium carbonate and the xylene layer, after settling, is recovered by decantation. The N-polybutylallyl ethylene diamine content of the xylene solution is determined from the nitrogen content of the solution and said amine content is adjusted to 50% concentration by evaporation of all the xylene and dilution with SAE 5W oil.

The N-substituted ethylene diamine of Example 6 is believed to have the formula Z—NH—C$_2$H$_4$NH$_2$ wherein Z is

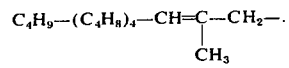

The following N—Z substituted N$_1$,N$_4$ bis(aminoalkyl) piperazine, di(hydroxyalkyl) alkylene polyamine and alkylene polyamine products of this invention can be prepared in the manner described in Examples 3–6:

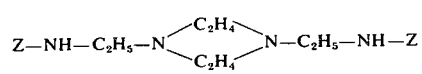

Z—NH—(C$_2$H$_4$NH)$_5$—Z wherein Z is C$_3$H$_7$(C$_3$H$_6$)$_{42}$—CH=CH—CH$_2$ from dichlorination of 764 $\overline{M}_n$ propene polymer followed by thermal cracking thereof to obtain 1-chloropropenyl polypropyl product, and reaction of 1-chloropropenyl polypropyl product with N$_1$,N$_4$-bis(aminoethyl) piperazine (2:1 mole ratio): N-di(hydroxyethyl) ethylene diamine (1:1 mole ratio): hexamethylene diamine (2:1 mole ratio, and pentaethylene hexamine (2:1 mole ratio).

The N-substituted tetraethylene pentamine product of Example 3 is used in a SAE 10W 30 weight oil formulation at 5.0 volume percent concentration in a Ford 289 cubic inch Engine Test for evaluation as a detergent at low temperature, in a SAE 30 weight oil formulation at 5.0 volume percent in a Caterpillar 1-H Engine Test for high temperature detergency and in a two cycle engine oil at .2 volume percent added to gasoline fuel used in a two cycle engine. Total sludge and varnish ratings of 43 and 35, respectively (ratings of 50 represent a clean engine) were obtained in the Ford 289 Engine Test, a passing rating with respect to piston lacquer and ring groove filling was achieved in the Caterpillar 1-H Engine Test and a B+ ration (A is clean engine rating) was achieved in the two cycle engine test. Those ratings compare favorably with more coupled ashless-type detergents currently in commercial use in motor oils sold for those purposes.

The invention claimed is:

1. An N-hydrocarbyl-substituted bis-(aminoalkyl) piperazine product having the formula

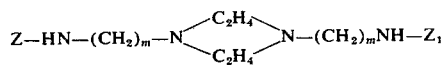

wherein $m$ is an integer from 1 to 10, Z is

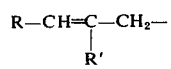

wherein R' is hydrogen or methyl and R consists of propyl or butyl units and the total carbon content of Z is in the range from about 25 to about 180 carbon atoms and wherein Z$_1$ is hydrogen or Z.

2. The product of claim 1 wherein R' is methyl and R has from about 5 to about 44 butyl units.

3. The N,N'-disubstituted N$_1$, N$_4$-bis(aminopropyl) piperazine of the formula

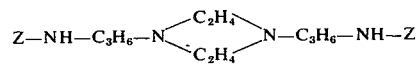

wherein each Z is

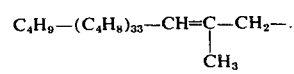

* * * * *

UNITED STATES PATENT OFFICE
CERTIFICATE OF CORRECTION

Patent No. 3,960,865　　　　　　　　　Dated June 1, 1976

Inventor(s) George S. Culbertson

It is certified that error appears in the above-identified patent and that said Letters Patent are hereby corrected as shown below:

Column 1, line 8,　　"continuation in part" should be --Continuation-in-Part --.

Column 4, line 2,　　"Z" should be -- Z- --.

Column 5, line 40,　　"($M_n$) should be -- ($\overline{M}_n$) --.

Column 8, line 26,　　"ration" should be -- rating --.

Signed and Sealed this

Seventh Day of September 1976

[SEAL]

Attest:

RUTH C. MASON
*Attesting Officer*

C. MARSHALL DANN
*Commissioner of Patents and Trademarks*